(No Model.)
E. A. STIGGINS.
WAXING DEVICE FOR WAX THREAD SEWING MACHINES.
No. 399,578. Patented Mar. 12, 1889.
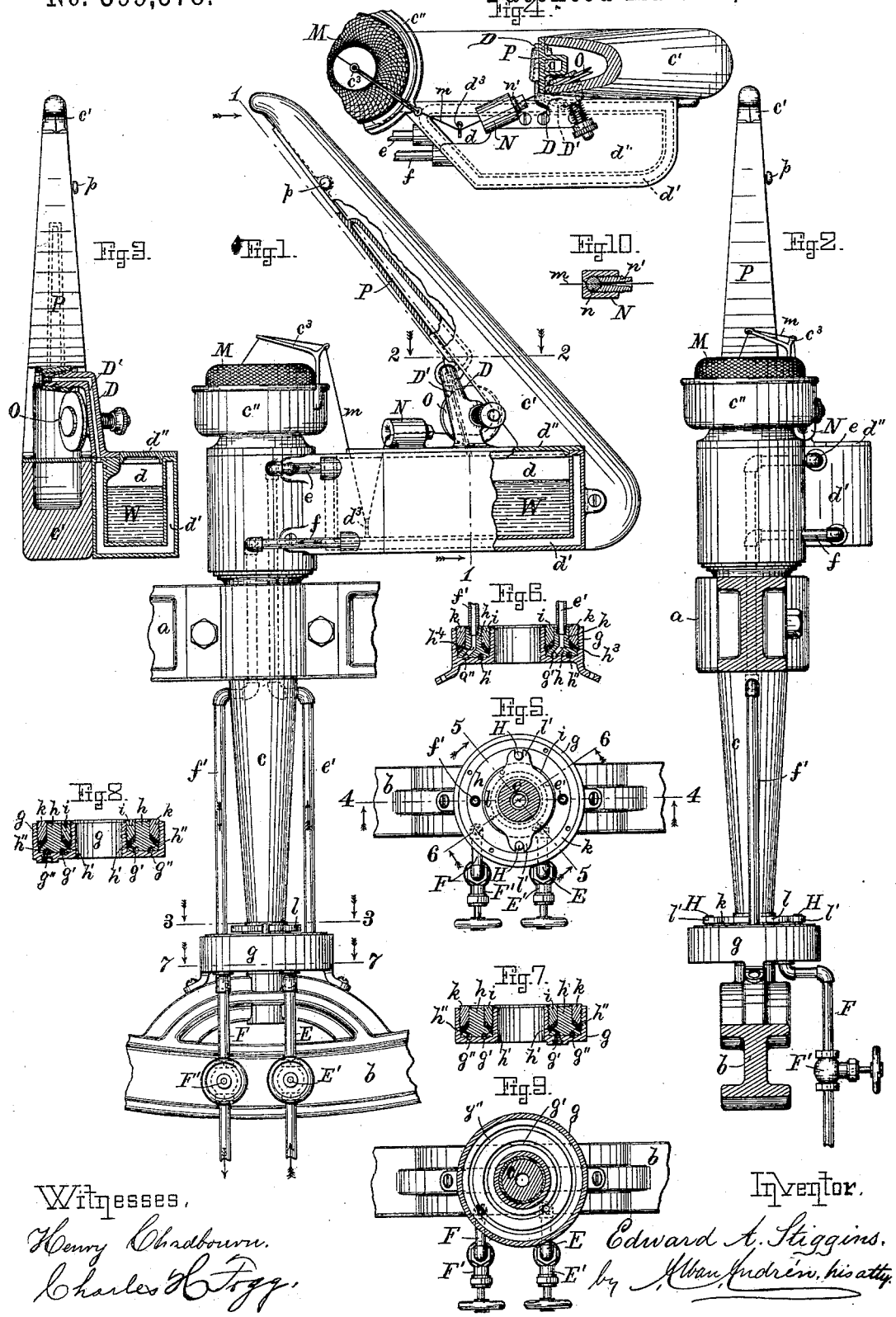
Witnesses.
Henry Chadbourn.
Charles H. Fogg.
Inventor.
Edward A. Stiggins
by Alban Andrews, his atty.

UNITED STATES PATENT OFFICE.

EDWARD A. STIGGINS, OF BROCKTON, MASSACHUSETTS, ASSIGNOR OF ONE-HALF TO HENRY G. PHIPPS, OF SAME PLACE.

WAXING DEVICE FOR WAX-THREAD SEWING-MACHINES.

SPECIFICATION forming part of Letters Patent No. 399,578, dated March 12, 1889.

Application filed October 25, 1887. Serial No. 253,339. (No model.)

*To all whom it may concern:*

Be it known that I, EDWARD A. STIGGINS, a citizen of the Dominion of Canada, and a resident of Brockton, in the county of Plymouth and State of Massachusetts, have invented new and useful Improvements in Waxing Devices for Wax-Thread Sewing-Machines, of which the following, taken in connection with the accompanying drawings, is a specification.

This invention relates to improvements in waxing devices for wax-thread sewing-machines, and it is carried out as follows, reference being had to the accompanying drawings, wherein—

Figure 1 represents a front elevation of the invention, showing a portion of the wax-tank, as well as a portion of the steam-chamber in the horn, in section. Fig. 2 represents a side elevation of the invention, showing the stationary frames in section. Fig. 3 represents a cross-section on the broken line 1 1 in Fig. 1. Fig. 4 represents a horizontal section on the line 2 2 in Fig. 1. Fig. 5 represents a horizontal section on the line 3 3 in Fig. 1. Fig. 6 represents a vertical section on the line 4 4 in Fig. 5. Fig. 7 represents a cross-section on the line 5 5 in Fig. 5. Fig. 8 represents a cross-section on the line 6 6 in Fig. 5. Fig. 9 represents a horizontal section on the line 7 7 in Fig. 1, and Fig. 10 represents a central longitudinal section of the wiper or scraper for removing the surplus wax from the thread after being waxed.

Similar letters refer to similar parts wherever they occur on the different parts of the drawings.

$a$ and $b$ represent the upper and lower portions of the sewing-machine frame, in which is journaled the vertical post $c$, that is provided in its upper end with the bent horn $c'$, as is in common in wax-thread sewing-machines. The post $c$ is made hollow, as usual.

To one side of the horizontal portion of the horn $c'$ is secured the wax-tank $d$, which is surrounded on its sides and bottom with a closed steam-jacket, $d'$, through which steam is caused to circulate for the purpose of heating the wax, W, contained within the tank $d$, as shown in Figs. 1, 2, and 3.

$e$ is the steam-supply pipe entering the upper portion of the steam-jacket $d'$, and connected to the pipe $e'$, that is secured to the post $c$ below its bearing $a$, as shown in Fig. 1. $f$ is a similar pipe leading from the lower portion of the steam-jacket $d'$ to the pipe $f'$, that is also secured to the post $c$ below the bearing $a$, and serves as a steam return-pipe, as well as a condensed-water return-pipe for the jacket $d'$, so as to establish a proper circulation of the steam through the jacket $d'$.

To the frame $b$ is secured in a suitable manner the annular cup $g$, through the central vertical perforation of which passes loosely the lower portion of the post $c$. In the bottom of the cup $g$ are made two annular grooves, $g'$ and $g''$, (shown in Figs. 6, 7, 8, and 9,) the former being connected to the steam-supply pipe E, leading from any suitable source of steam-pressure, and the latter being connected to the drip, return, or exhaust pipe F, as shown in Figs. 5 and 9. E' and F' are valves or cut-offs on the respective pipes E and F, as shown in Figs. 1, 5, and 9.

Within the cup $g$ is arranged the annular ring $h$, made of metal and having its under side ground or finished to fit steam-tight against the bottom of the annular cup $g$, as shown in Figs. 6, 7, and 8. On the under side of the ring $h$ are made annular grooves $h'$ and $h''$, arranged directly opposite the respective grooves $g'$ and $g''$ in the bottom of the cup $g$, as shown in said Figs. 6, 7, and 8. The ring $h$ is held against the bottom of the cup $g$ by means of annular packing rings or glands $i\,k$, that are screwed into the interior sides of the inner and outer wall of the cup $g$, respectively, as shown in said Figs. 6, 7, and 8, and suitable packings are interposed between the under side of the annular glands $i\,k$ and the enlarged lower portion of the ring $h$, as shown in said Figs. 6, 7, and 8. The lower ends of the pipes $e'\,f'$ are screwed to or otherwise firmly secured to the ring $h$, as shown in Fig. 6, there being in the said ring two perforations or channels, $h^3$ and $h^4$, the former connecting the steam-supply pipe $e'$ to the annular grooves $g'$ and $h'$ and to the steam-supply pipe E, and the latter connecting the return-pipe $f'$ to the grooves $g''\,h''$ and to the return or drip pipe F, as shown in Fig. 6. The post c being secured to the pipes $e'$ $f'$, and the latter being secured to the ring $h$, it will be seen that the latter partakes of the motion of said post c when it is turned around its axis; but to prevent undue strain on said pipes $e'$ $f'$ during such turning of the post c, I secure to the latter a flange or collar, $l$, having forked or perforated projections or ears $l'$ $l'$, into which are fitted pins or projections H H, secured to the ring $h$, as shown in Figs. 1 and 5.

It will thus be seen that by the arrangement and combination of parts as above described the post c may be turned completely around its axis in its bearings $a$ $b$ without breaking the connection between the stationary pipes E F and the corresponding movable pipes $e'$ $f'$, thus insuring at all times a proper circulation of steam in the jacket $d'$ for the proper heating of the wax in the tank $d$.

On the top of the wax-tank $d$ is arranged the cover $d''$, which may be hinged to said tank or otherwise secured temporarily in place on top of the said tank, as may be most convenient and practical.

On top of the post c is located the cup or receptacle $c''$ for the ball of thread M, from which the thread $m$ to be waxed is carried, by means of the guide $c^3$, secured to the cup $c''$, into the molten wax in the tank $d$, and through the hook or eye $d^3$ within said tank $d$ upward through the wiper or scraper N, that is secured to the top of the tank $d$ or the horn $c'$, and said wiper serves the purpose of removing from the waxed thread the superfluous wax. The said wiper consists of the hollow cylinder N, having arranged within it the perforated ball $n$, preferably made of rubber, which ball is kept in place within said hollow cylinder N by means of the hollow cylinder or sleeve $n'$, that is screwed through the rear portion of the hollow cylinder N, as shown in Fig. 10. The waxed thread $m$, after passing through the wiper N, is conducted around and between the tension-rolls O to the top of the horn $c'$ in the usual manner, said tension disks or rolls being constructed as is usual in wax-thread or other sewing-machines; but during the passage of the waxed thread $m$ from the tension-rolls to the whirl at the top of the horn $c'$ it is very essential that the waxed thread should be prevented from cooling, so as to obtain the best results in doing the work, and for this purpose I arrange within the horn $c'$ a hollow chambered arm, P, the lower end of which is pivoted to a projection, D, of the wax-receptacle $d$ in the same manner as gas-brackets are pivoted to their connections, (see Figs. 1, 3, and 4,) said projection D having an interior bore or channel, D', in open communication with the steam-jacket $d'$, as shown in Fig. 3, by which the steam from the latter is communicated to the interior of the hollow chambered arm P, in close proximity to which the thread $m$ is carried on its way from the tension-rolls O to the whirl at the top of the horn $c'$, and by which arrangement the waxed thread is kept soft and pliable. The arm P is pivoted to the projection D on the wax-chamber $d$ to enable said arm to be swung out of position to reach the connecting mechanism for the whirl, that is arranged, in the usual manner, within the inclined portion $c'$ of the horn of the machine, for repairing the said connecting mechanism or for other purposes. The hollow arm P is secured in place to the horn $c'$ by means of a spring-pressed button, $p$, spring, screw, or equivalent or well-known device.

Having thus fully described the nature, construction, and operation of my invention, I wish to secure by Letters Patent, and claim—

1. The combination, with the post and horn of a wax-thread sewing-machine, of a jacketed wax-tank, the stationary cup $g$, having inner and outer annular grooves, the rotating ring $h$, having inner and outer annular grooves and vertical pins or projections H, the pipes $e'$ and $f'$, leading, respectively, from the grooves to the jacketed tank, the pipe E, leading from a source of steam-pressure to the inner grooves, the drip leading from the outer grooves, and the collar $l$, secured to the post and engaging the pins or projections on the ring, substantially as described.

2. The combination of a jacketed wax-tank, a bracket, D, having the channel D' communicating with the jacketed tank, the horn $c'$, the chambered arm P, pivoted to the bracket and communicating with the channel therein, and a steam-supply for the tank, substantially as described.

In testimony whereof I have signed my name to this specification, in the presence of two subscribing witnesses, on this 20th day of October, A. D. 1887.

EDWARD A. STIGGINS.

Witnesses:
ALBAN ANDRÉN,
HENRY CHADBOURN.